Figure 1:
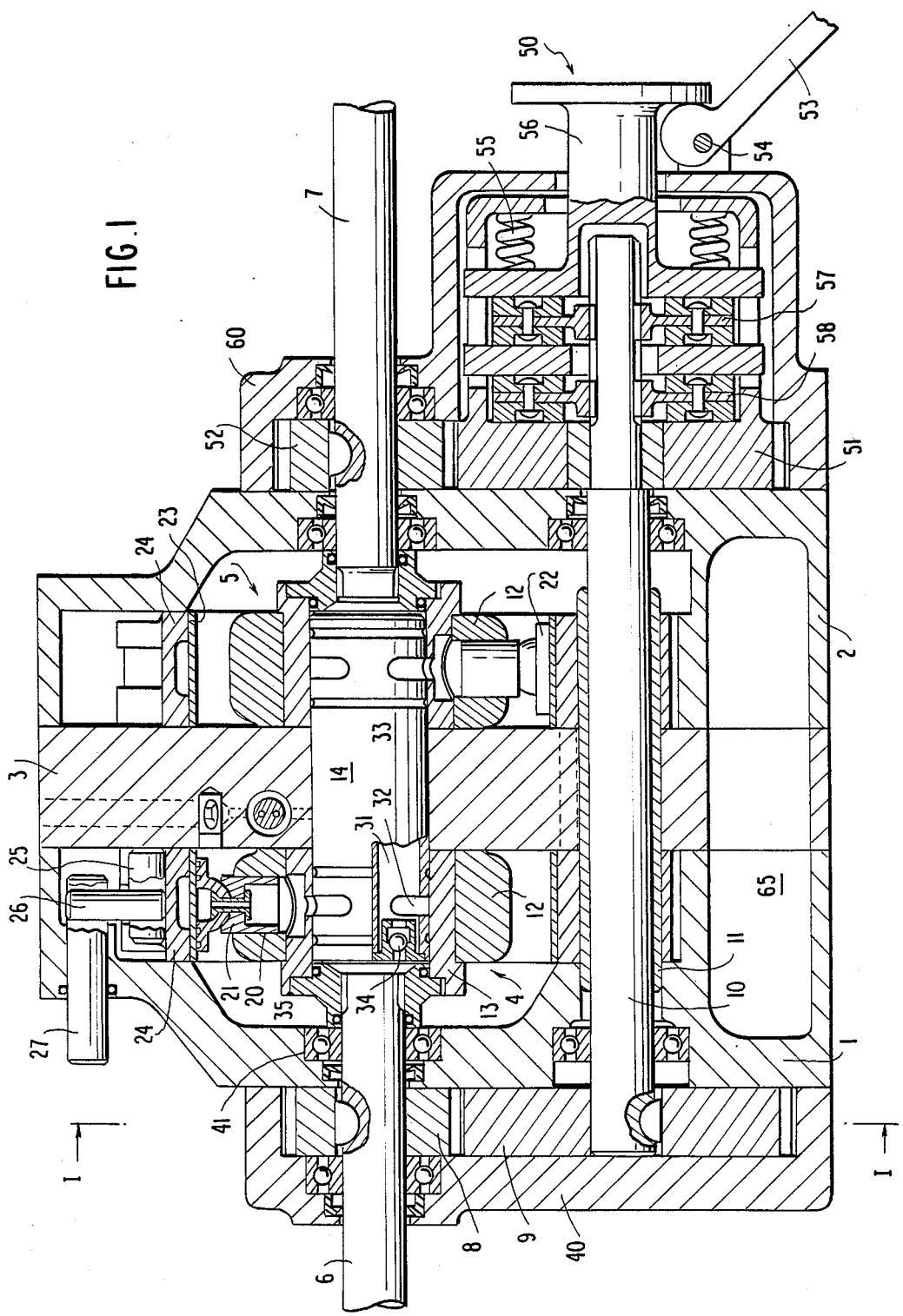

United States Patent [19]

Thoma et al.

[11] Patent Number: 4,843,818
[45] Date of Patent: Jul. 4, 1989

[54] ROTARY HYDROSTATIC MACHINES OR TRANSMISSIONS

[76] Inventors: Christian H. Thoma, Chalet Abaco, Green Rd., St. Clement, Jersey C.I.; George D. M. Arnold, Undercliffe Rd., St. Helier, Jersey C.I., both of Great Britain

[21] Appl. No.: 87,390

[22] Filed: Aug. 20, 1987

[30] Foreign Application Priority Data

Aug. 29, 1986 [GB] United Kingdom ................ 8621003
Nov. 7, 1986 [GB] United Kingdom ................ 8626701

[51] Int. Cl.$^4$ ............................................. F16D 39/00
[52] U.S. Cl. ...................................... 60/488; 60/489; 91/498
[58] Field of Search ................. 60/487, 488, 489, 490; 91/497, 498, 491

[56] References Cited

U.S. PATENT DOCUMENTS

| | | |
|---|---|---|
| 1,266,606 | 5/1918 | Manly . |
| 2,818,707 | 1/1958 | Sturm ................................... 60/490 |
| 3,521,449 | 7/1970 | Speggiorin ........................ 91/497 X |
| 3,740,953 | 6/1973 | Mori ................................. 60/490 X |
| 4,091,717 | 5/1978 | Bojas et al. ........................... 91/498 |
| 4,458,486 | 7/1984 | Baker ................................ 60/494 X |
| 4,635,535 | 1/1987 | Thoma et al. ......................... 91/498 |
| 4,679,396 | 7/1987 | Heggie ............................. 60/490 X |

FOREIGN PATENT DOCUMENTS

| | | |
|---|---|---|
| 3440219 | 5/1985 | Fed. Rep. of Germany ...... 417/273 |
| 722004 | 1/1955 | United Kingdom ................. 60/490 |
| 1281094 | 7/1972 | United Kingdom . |

Primary Examiner—Edward K. Look
Attorney, Agent, or Firm—Young & Thompson

[57] ABSTRACT

A hydrostatic machine including a casing 1 containing a rotary member 12 having radial cylinders 20 each with a piston 21 engaging a track ring 23. Both input 6 and output shafts 7 are connected either hydraulically through the transmission rotary members 12 or mechanically through a bypass shaft 10 and clutch 50 for reducing machine heat losses. Hydraulic ram 106,110 assistance for cushioning out pressure transients when transmission power returns from mechanical to hydraulic. Internal oil ducts 72,80.90 included for providing further temperature control for the main internal transmission component parts 14.24 said ducts 72,80,90 feed from a auxiliary fluid pump 8,9.

19 Claims, 5 Drawing Sheets

ROTARY HYDROSTATIC MACHINES OR TRANSMISSIONS

This invention relates to rotary hydrostatic transmissions comprising a hydraulic pump and motor of the radial piston type.

It is an object of the invention to provide an improved hydrostatic machine which may be particularly suitable for example to high-duty hydrostatic transmissions such as are used in off-road vehicles or farm tractors and will avoid some of the problems experienced with existing transmissions.

In many such installations, compactness is of paramount importance and this invariably leads to difficulties in terms of heat generation within such transmissions causing poor operational efficiency and service life and it is an object of the present invention to avoid some of the problems experienced with existing transmissions.

Broadly stated the invention consists of a hydrostatic machine including a casing containing a rotary member which provides generally radial cylinders each accommodating a piston which is actuated by a surrounding cam track as the member rotates and including transmission means for coupling the rotary member to an external shaft and means for supplying fluid to and from the cylinders as the member rotates.

Preferably two such rotary members are combined and mounted on a common fixed pintle provided with internal fluid flow and return passages which form a closed loop hydraulic circuit of the hydrostatic transmission. The pintle may be provided with one or more check valves communicating with the machine chamber either directly or via a auxiliary oil "charge" pump.

At present due to the above mentioned disadvantages of hydrostatic transmissions, standard gear shift transmissions are most commonly fitted to such vehicles, and therefore it is necessary for any improved hydrostatic transmission to fit into the same space evelope currently available in such vehicles.

For reasons of compactness it is therefore desirable to mount the pump and motor in a back-to-back configuration and as a result one of the problems associated with such layouts is that it is very difficult to keep the internal elements of the transmission sufficiently cool and so avoid complete seizure.

A further refinement required is to provide a mechanical through drive so that the bulk of the engine power no longer has to be transmitted through the hydraulic circuit of the transmission during periods when the vehicle is operated at full forward speed, for instance along the heighway. As a result, overall efficiency is improved and possible build-up of heat with the hydrostatic transmission is drastically reduced.

All existing radial piston transmissions utilising the back-to-back configuration where both pump and motor driving elements rotate on the same fixed cylindrical pintle valve suffer a marked deterioration in performance and life expectancy when internal temperature rise above normal safe levels. This may occur when such transmissions are overloaded for longer periods than usual at high input speeds or when the usual means for cooling the transmission oil is no longer effective. Such high temperature conditions become especially serious for certain sensitive components such as the hydrostatic bearing of the pintle valve and the slipper shoes.

If the transmission is to be operated with its casing interior full of oil, the slipper shoes will remain sufficient cool so long as the case oil does not overheat. However the pintle is more prone to overheating due to its encapsulated position, as all heat must first be transferred to its surrounding components before it can pass through into the case oil.

This effect of heat build-up in the pintle is further exaggerated in a dry case transmission, where a smaller volume of case oil is used and remains in the sump or reservoir at the bottom of the transmission. As the oil is not in direct contact with the working elements of the transmission, such dry case machines are more difficult to cool. In this case the self-generated heat from the working components can only be removed by "splash" cooling, where oil from an auxiliary pump is allowed to flow over the rotating elements so to draw heat away. However, as the pintle valve is totally surrounded by other components, very little oil can reach it for cooling, and as a consequence it may become damaged.

However many of the cooling problems associated with prior transmissions are easily overcome with the disclosed features of the present invention which not only reduce parasitic power losses through the engagement of a mechanical drive link, but also includes special flow passages within the pintle and track ring elements so that cool oil from the auxiliary pump can be constantly circulated through these said components when the hydrostatic transmission is in full operation as well as when the bulk of engine power passes through the mechanical drive link rather then through the hydrostatic transmission.

Figure 2:
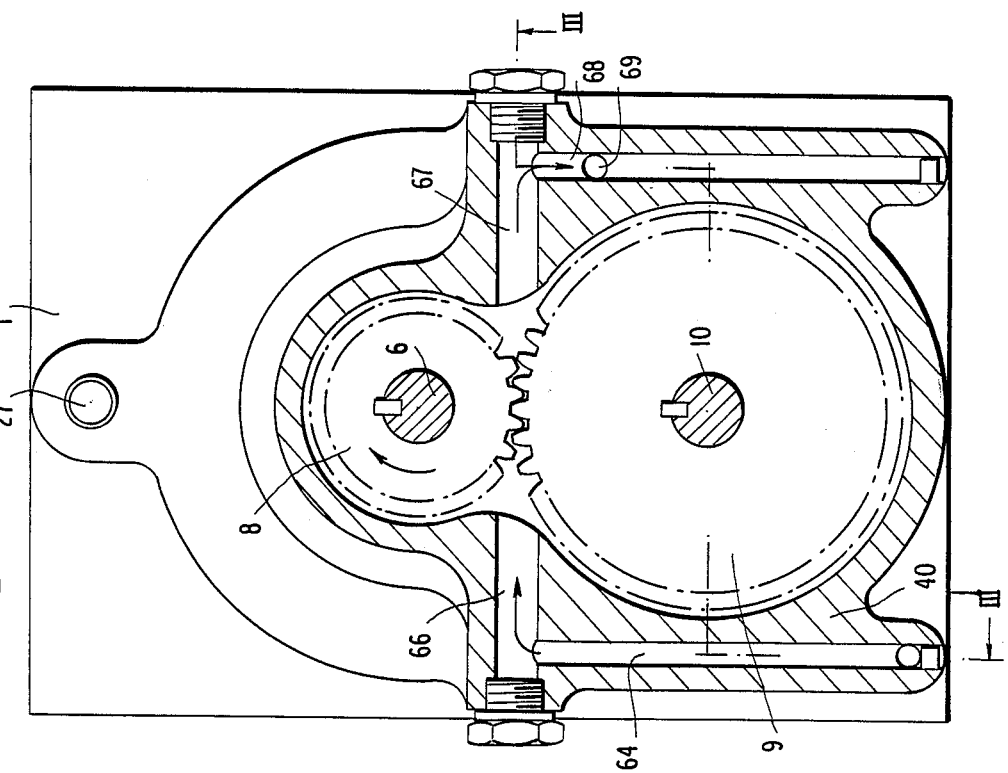
Figure 3:
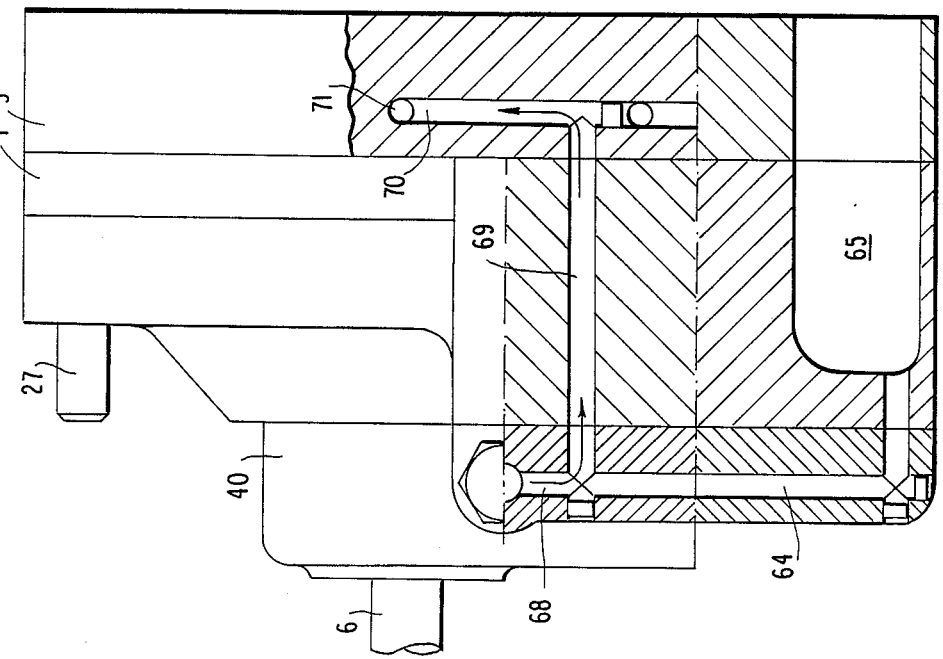
Figure 6:
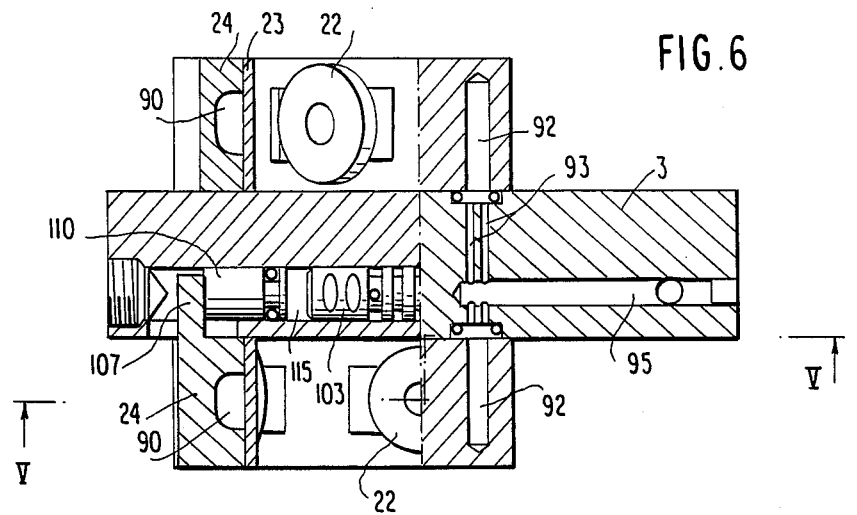
Figure 4:
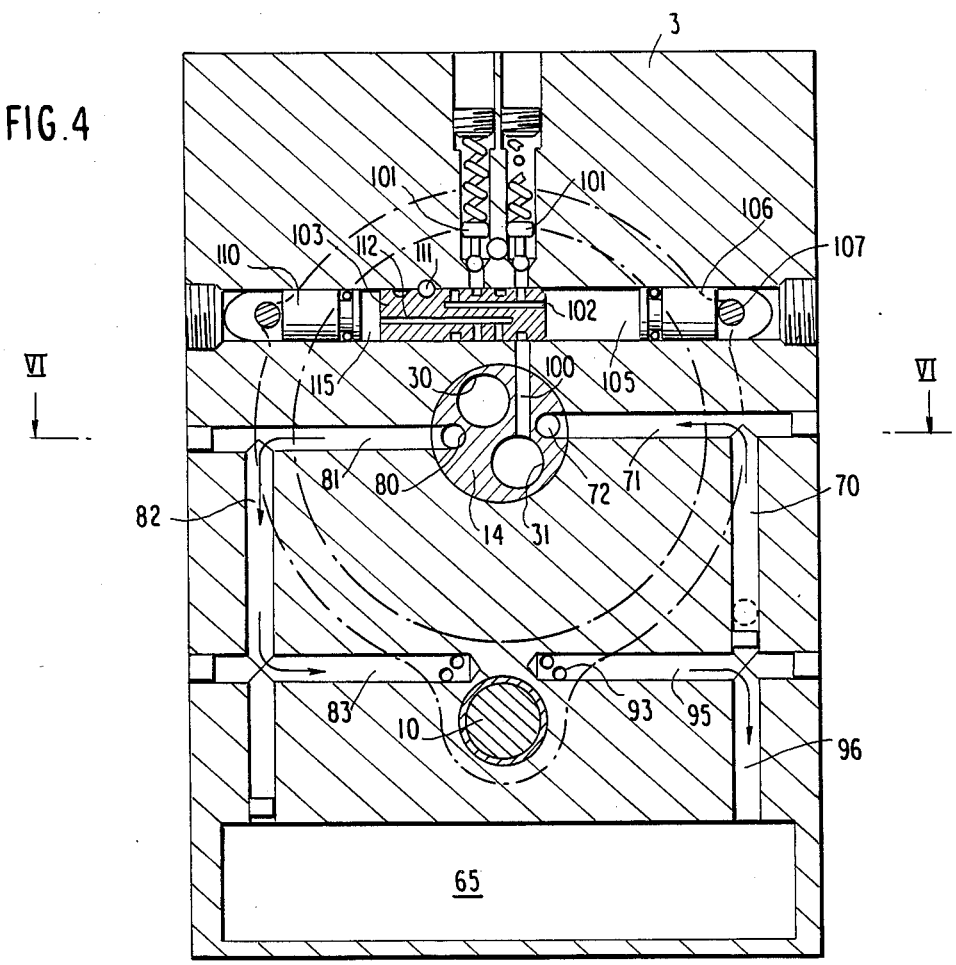
Figure 5:
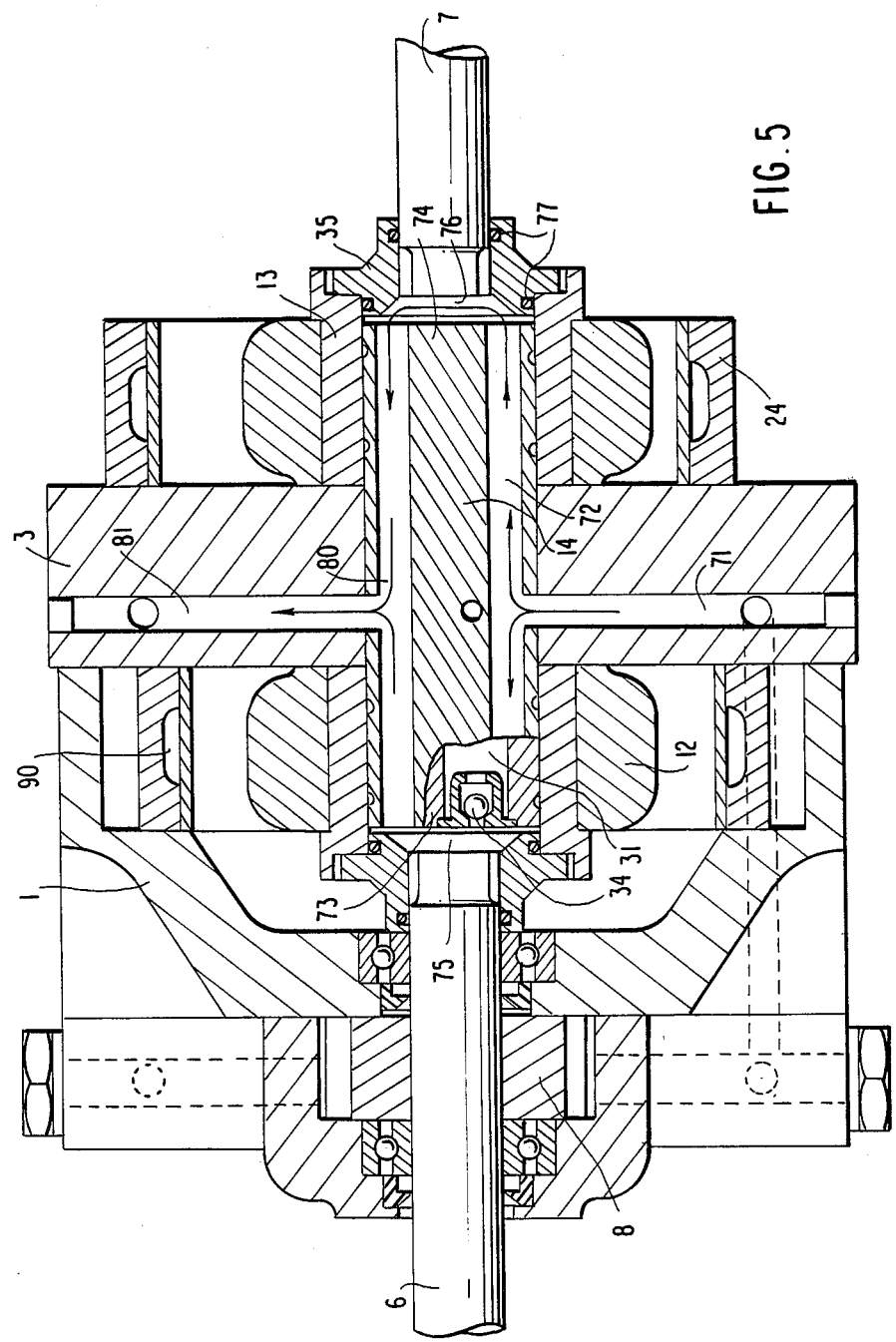
Figure 7:
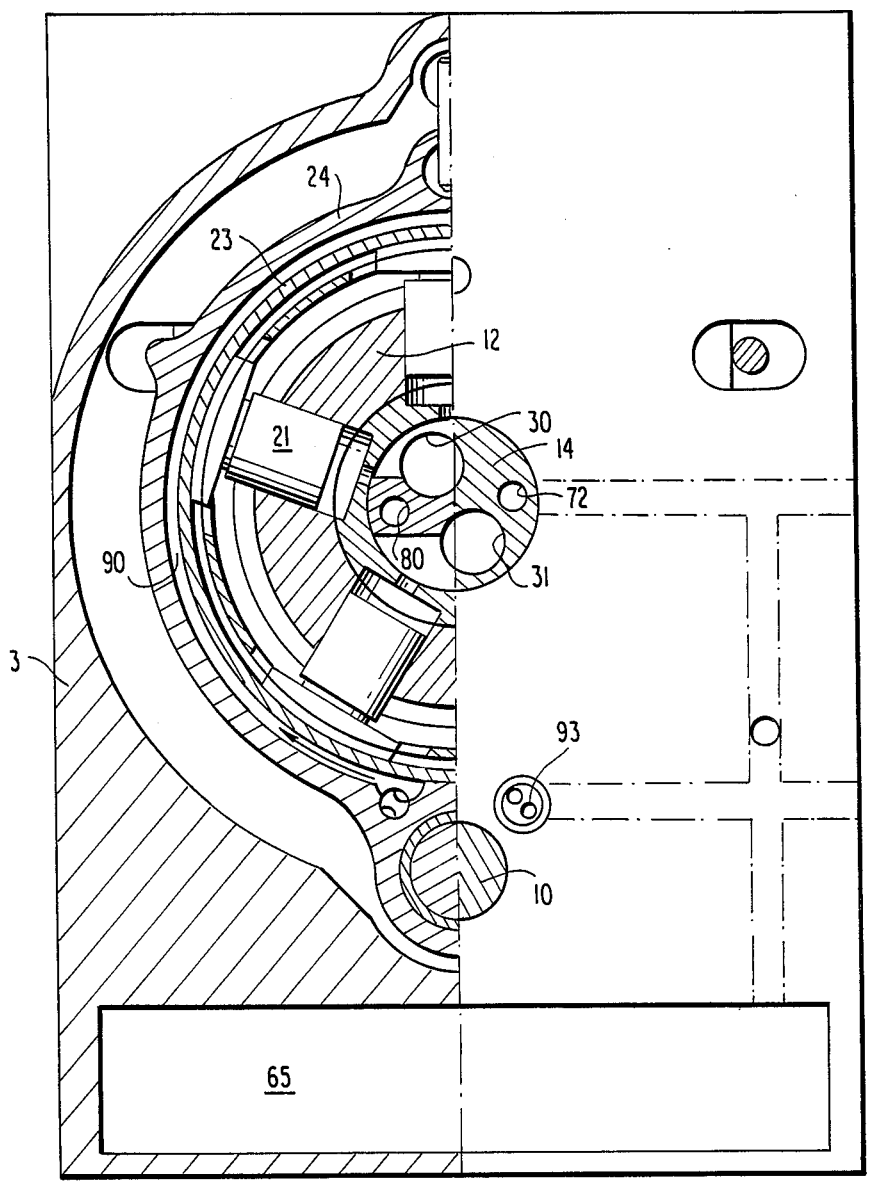

The invention may be performed in various ways and one specific embodiment will now be described, by way of example, with reference to the accompanying drawings, in which:

FIG. 1 is a sectional side elevation through a radial piston transmission according to the invention.
FIG. 2 is a cross-section on the line A—A in FIG. 1.
FIG. 3 is a cross-section on the line C—C in FIG. 2.
FIG. 4 is a cross-section on the line B—B in FIG. 1.
FIG. 5 is a cross-section on the line F—F in FIG. 4.
FIG. 6 is a cross-section on the line D—D in FIG. 4.
FIG. 7 is a cross-section on the line E—E in FIG. 6.

In this example the invention is applied to a rotary hydrostatic transmission for a medium to heavy duty farm tractor. The transmission illustrated in FIG. 1 comprises two main case covers 1,2 and a central sandwich plate 3 and these contain the rotary hydrostatic pump 4 and the rotary hydrostatic motor 5, the engine of the vehicle being coupled to drive an external input drive shaft 6 at one end of the casing with the output shaft 7 at the other end of the casing, coupled to the vehicle's driving wheels via differential and reduction gearing. The input shaft 6 may be connected via a gear train 8,9 to drive an secondary bypass-shaft 10 that for reasons of compactness is shown passing through the hollow pivot pin 11 of the transmission.

The pump 4 and motor 5 of the transmission are of generally similar construction. Each comprises a rotary cylinder block 12 attached to a ported sleeve 13 mounted to rotate on each end of a common fixed pintle 14, which is rigidly secured in a central sandwich plate 3 acting as an internal partition between the case covers 1,2. Each cylinder block 12 is formed with a number of radial bores 20 each containing a piston 21 attached to a slipper 22, that act against a surrounding annular track surface 23. Preferably the track ring 24 has the hardened ring 23 inserted into its bore.

Ideally the two track rings 24 are pivotally mounted on a common transverse pivot pin 11 and where the track ring of the pump 4 is connected through the movable control pins 25,26 to a control lever 27 that is linked to the manual transmission ratio control lever in the cab of the vehicle.

Thus by turning the control lever 27 the eccentricity of the track ring 24 pivoting on hollow pin 11 is altered in relation to the fixed pintle 14, thereby changing the volumetric capacity of the pump and hence the speed ratio of the complete transmission.

The fixed pintle 14 two internal longitudinal passages 30,31. Passage 31 is shown opening at opposite ends into an arcuated port 32,33 which communicates with respective cylinder bores 20 as the cylinder member 12 rotates. At one end of the pintle 14 there is provided one or more check valves 34 arranged to allow additional fluid to be drawn into the oil circuit 31 for "make-up" purposes so to replenish any fluid lost by leakage.

A seperate casting 40 incorporating two spur gears 8,9 shown in FIG. 2 may be attached to the primary housing 1 of the transmission. Gear 8 is keyed to the input drive shaft 6 and meshes with the larger gear 9 locked onto the bypass-shaft 10.

The two gears 8,9 may also conveniently be used as the auxiliary oil pump for providing "make-up" fluid for the main oil circuit as well as for oil filtration and cooling.

Input drive shaft 6, which is supported in ball bearings 41, connects with the rotary cylinder member 12 by way of the drive coupling element 35 as shown in FIG. 1.

If the driver wishes to move the vehicle from rest, he moves the lever from the neutral position into forward drive. Therefore the transmission ratio is altered as the track ring 24 is moved to an eccentric position relative to the fixed pintle 14. Up to the point of full eccentricity, all power is transmitted hydraulically to shaft 7 of the hydraulic transmission.

During this period, clutch 50 remains disengaged from the transmission output shaft 7, and therefore the bypass-shaft 10 does not transmit any power through the gears 51,52.

However when full eccentricity is reached, the vehicle operator may wish to engage mechanical through drive by engaging clutch 50 so that engine power is now routed bypass-shaft 10 and through gears 51,52 to output shaft 7.

This is only possible when the transmission motor 4 is rotating at the same speed as the transmission pump 3, and when the gears 51,52 are of the same ratio as gears 8,9.

The clutch 50 is engaged through straight mechanical, electrical or hydraulic means acting on lever 53 which pivots on pin allowing the springs 55 acting on the flange member 56 to force friction discs 57,58 together onto the end face of gear 51.

As a result, a direct connection between shaft 10 and gear 51 is made and therefore almost all the power (except for small losses in rotating the hydraulic elements) passes through the transmission mechanically and no longer hydraulically.

Both friction discs 57,58 are splined onto the spigoted end of shaft 10 and the complete clutch 50 assembly and gears 51,52 are contained within the end housing 60.

Under these conditions the transmission rotary member 3 is still being driven by way of gear 33 and shaft 34, and as the track ring 16 is set at full eccentricity, the pistons 14 will still be pumping oil into the hydraulic motor 4. However the working elements of both pump and motor do still generate some heat and if this cannot be extracted sufficiently quickly, the rotating elements of the transmission may overheat resulting in damage to the bearing surfaces. Therefore the present disclosed improvement allows for cooling oil to be pumped through the pintle and track ring elements thereby prevent such overheating.

However because the transmission rotary member 4 is also driven by shaft 5 through gears 251,252 at the same speed as its opposite rotary member 3, the overall effect is that both rotary members are not transmitting any power between them. Even so, in order for this to be the case, it is necessary for the displacement of both pump and motor to be near identical. This can be done by including a screw adjustment on the motor track ring, so that under test prior to sale, the transmission motor can be adjusted in displacement until it matches the pump displacement.

Under operation, a further advantage of the transmission is that as soon as the tractor driver reduces the eccentricity of the pump member 3 by way of altering the setting of the transmission control lever, a linkage disengages the clutch in the axle, so returning all drive power back through the hydraulic transmission circuit.

Another advantage of the transmission is that as both rotary members are always in rotation during mechanical drive-through, that at the moment when this link is broken, and all the power is transmitted back through the hydraulic circuit, no serious jerk occurs to the vehicle. This would not be the case if the rotary members 3,4 were stationary at the moment when power is to be passed through them.

In order to reduce the control forces of the transmission, it is preferable that a servo ram system operating off the high pressure oil circuit is included. This is shown in FIG. 4 where high pressure oil is ducted out from the pintle oil gallery 31 through a passage which not only leads to a high pressure relief valve 101, but also to passage 102 in the valve plug 103, which thereby provides a path for the oil to enter cylinder 105 of the servo ram 106, this ram 106 acts against a stop 107 located on the track ring 24.

This ram helps reduce control force that the operator requires to alter the transmission ratio, so allowing for smoother transition from mechanical into hydraulic drive.

The valve plug 103 is designed so that it can be locked in either one of two positions depending on the desired output rotation of the transmission. In its second position (not shown), pressure oil in gallery 31 is directed to the opposite servo ram 110 via passage 112 located in valve plug 103. Pin 111 locks the valve plug 103 in place in the sandwich plate 3.

A hydrostatic transmission of the type disclosed including the mechanical through-drive and clutch, it becomes convenient to use the two gears 8,9 linking input shaft 6 to through-drive shaft 10 as a gear pump for ancilliary purposes.

The meshing gears 8,9 act to draw cool oil up through a feed passage 64 from the reservoir 65 to the suction cavity 66 of the gear pump as shown in FIGS. 2 and 3. The oil is delivered at 67 and flows through the small internal passages 68,69,70,71 in the sandwich plate 3 and into the pintle cooling circuit shown in FIG. 5.

As the oil flows to either ends of the pintle 73,74 through the axial passage 72, it will absorb some of the heat contained within the pintle 14 member. The oil flows to both cavities 75,76 formed between the pintle ends and the drive coupling 35. Two small seals 77 at positioned at each end of the drive coupling 35 to prevent oil from the cavities 75,76 seeping out into the interior of the housing.

If the check valves 34 are positioned at the ends of the main transmission oil galleries 30,31 at the pintle end 73, a small proportion of the cooling oil delivered from the auxiliary gear pump 8,9 into cavities 75,76 will also provide the necessary make-up oil for the transmission oil circuit 30,31.

The remaining oil flows out of the pintle through axial passage 80, and through a number of passages 81,82,83 in the sandwich plate 3 and into a cavity 90 formed between the track ring 24 and the inserted ring 23 as shown in FIGS. 4,6 and 7. This oil further absorbs the heat generated on the slipper engagement surface and passes out through from the cavity at 92 into passages 93,95,96 and returning to the reservoir 65.

Preferably the oil flow from the gear pump is directed through a filter and radiator type oil cooler before it enters the cooling oil circuit 72,80 in the pintle.

Although this invention is primarily concerned with rotary radial piston transmissions it should be noted that the improvements related to cooling the pintle and track ring members may equally be effective when applied to either a seperate pump or motor.

We claim:

1. A hydrostatic transmission comprising
a casing;
an internal transverse partitioning wall dividing said casing into first and second chambers;
a pintle fixedly and non-rotatably mounted in said partitioning wall, said pintle having first and second ends extending into said first and second chambers, respectively, and including at least two internal longitudinal hydraulic fluid passages terminating in ports;
a rotary cylinder member rotatably mounted on each of said first and second extending pintle ends, each said cylinder member comprising a plurality of radially arranged cylinders and a plurality of pistons disposed in said cylinders, said cylinders successively communicating with said ports during rotation of said cylinder members;
an annular cam track surrounding each said cylinder member, said pistons operatively connected to said cam track;
first and second rotary shafts rotatably mounted in said casing and extending into said first and second chambers, respectively, and means coupling said shafts to said cylinder members;
a third rotary shaft rotatably mounted in said casing and mechanically coupled to said first rotary shaft, said third rotary shaft passing through said partitioning wall and engageable to said second rotary shaft by clutch means whereby said first and second rotary shafts are cooperatively engaged by said third rotary shaft when said clutch is engaged.

2. The hydrostatic transmission of claim 1 wherein said annular cam track is supported by a hollow pivot pin.

3. The hydrostatic transmission of claim 2 wherein said third rotary shaft is positioned to pass within and through said hollow pivot pin.

4. The hydrostatic transmission of claim 1 wherein said first and second rotary shafts are coaxial and extend from said casing.

5. The hydrostatic transmission of claim 1 further including a first gear train which mechanically couples said first and third rotary shafts and a second gear train which mechanically couples said second and third rotary shafts, each said coupling occurring when said clutch is engaged, and the gear ratio of said first and second gear trains being identical.

6. The hydrostatic transmission of claim 5 wherein at least one of said first and second gear trains comprises a gear pump which provides fluid to said cylinders of said rotary cylinder members within said casing.

7. The hydrostatic transmission of claim 1 where said clutch is housed outside of said casing in a secondary casing.

8. The hydrostatic transmission of claim 1 wherein said clutch comprises gear means.

9. The hydrostatic transmission of claim 1 further including two hydrostatic rams housed within said partitioning wall member, said hydrostatic rams acting against one or both of said cam tracks, and said partitioning member including internal fluid ducts in communication with said internal longitudinal hydraulic fluid passages and serving to provide hydraulic pressure to said rams.

10. The hydrostatic transmission of claim 9 further including a pressure relief valve housed within said partitioning wall member, said pressure relief valve being in fluid communication with said internal fluid ducts, said pressure relief valve serving to direct fluid to one of said rams to balance a force produced by the other ram.

11. A hydrostatic transmission comprising
a casing;
an internal transverse partitioning wall dividing said casing into first and second chambers;
a pintle fixedly and non-rotatably mounted in said partitioning wall, said pintle having first and second ends extending into said first and second chambers, respectively, and including at least four internal longitudinal hydraulic fluid passages, at least two of said internal longitudinal hydraulic fluid passages terminating in ports;
a rotary cylinder member rotatably mounted on each of said first and second extending pintle ends, each said cylinder member comprising a plurality of radially arranged cylinders and a plurality of pistons disposed in said cylinders, said cylinders successively communicating with said ports during rotation of said cylinder members;
an annular cam track surrounding each said cylinder member, said pistons operatively connected to said cam track;
an input rotary shaft and an output rotary shaft rotatably mounted in said casing and extending into said first and second chambers, respectively, and means coupling said shafts to said cylinder members; and
wherein said internal longitudinal hydraulic fluid passages other than those terminating in said ports pass unobstructed through said pintle to hydraulically link said first and second ends of said pintle.

12. The hydrostatic transmission of claim 11 further including radial fluid transfer ducts in said partitioning wall which are in communication with said internal longitudinal hydraulic fluid passages which pass through said pintle.

13. The hydrostatic transmission of claim 12 wherein said radial fluid transfer ducts are in communication with an auxillary hydraulic pump.

14. A hydrostatic transmission comprising a casing;

an internal transverse partitioning wall dividing said casing into first and second chambers;

a pintle fixedly and non-rotatably mounted in said partitioning wall, said pintle having first and second ends extending into said first and second chambers, respectively, and including at least two internal longitudinal hydraulic fluid passages terminating in ports;

a rotary cylinder member rotatably mounted on each of said first and second extending pintle ends, each said cylinder member comprising a plurality of radially arranged cylinders and a plurality of pistons disposed in said cylinders, said cylinder successively communicating with said ports during rotation of said cylinder members;

an annular cam track surrounding each said cylinder member, said pistons operatively connected to said cam track;

an input rotary shaft and an output rotary shaft rotatably mounted in said casing and extending into said first and second chambers, respectively, and means coupling said shafts to said cylinder members; and said annular cam track having an internal fluid cavity following a path between an inner and outer diameter of said annular cam ring, the ends of said cavity terminating without joining.

15. The hydrostatic transmission of claim 14 wherein said internal fluid cavity of said annular cam track follows a circular path.

16. A hydrostatic transmission comprising a casing;

an internal transverse partitioning wall dividing said casing into first and second chambers;

a pintle fixedly and non-rotatably mounted in said partitioning wall, said pintle having first and second ends extending into said first and second chambers, respectively, and including at least two internal longitudinal hydraulic fluid passages terminating in ports;

a rotary cylinder member rotatably mounted on each of said first and second extending pintle ends, each said cylinder member comprising a plurality of radially arranged cylinders and a plurality of pistons disposed in said cylinders, said cylinders successively communicating with said ports during rotation of said cylinder members;

an annular cam track surrounding each said cylinder member, said pistons operatively connected to said cam track;

an input rotary shaft and an output rotary shaft rotatably mounted in said casing and extending into said first and second chambers, respectively, and means coupling said shafts to said cylinder members; and each said partitioning wall and annular cam track including a fluid coupling means adapted to cooperate with each other.

17. The hydrostatic transmission of claim 16 wherein each said fluid coupling means includes fluid supply and fluid return ports.

18. The hydrostatic transmission of claim 16 wherein said partitioning wall and said annular cam track each includes two fluid coupling means, with the fluid coupling means of said partitioning wall adapted to cooperate with the fluid coupling means of said annular cam track.

19. The hydrostatic transmission of claim 16 wherein said annular cam track includes an internal fluid cavity which follows a path between an inner and outer diameter of said annular cam ring, the ends of said cavity terminating in fluid supply and return ports, respectively, with said fluid supply and return ports forming the said fluid coupling means of said annular cam track.

* * * * *